United States Patent
Okada

(10) Patent No.: US 9,667,612 B2
(45) Date of Patent: May 30, 2017

(54) CAPTCHA PROVISION METHOD AND PROGRAM

(75) Inventor: Mitsuo Okada, Kyoto (JP)

(73) Assignee: Capy, Inc., Newark, DE (US)

( * ) Notice: Subject to any disclaimer, the term of this patent is extended or adjusted under 35 U.S.C. 154(b) by 186 days.

(21) Appl. No.: 14/370,937

(22) PCT Filed: Jan. 6, 2012

(86) PCT No.: PCT/JP2012/050202
§ 371 (c)(1),
(2), (4) Date: Nov. 17, 2014

(87) PCT Pub. No.: WO2013/103019
PCT Pub. Date: Jul. 11, 2013

(65) Prior Publication Data
US 2015/0143495 A1 May 21, 2015

(51) Int. Cl.
*H04L 29/06* (2006.01)
*G06F 21/31* (2013.01)
*H04L 29/08* (2006.01)

(52) U.S. Cl.
CPC .............. *H04L 63/08* (2013.01); *G06F 21/31* (2013.01); *G06F 2221/2133* (2013.01); *H04L 67/02* (2013.01)

(58) Field of Classification Search
CPC ....... G06F 21/31; H04L 63/08; H04L 63/083; H04L 9/32; H04L 63/0861
(Continued)

(56) References Cited

U.S. PATENT DOCUMENTS 8,209,743 B1 * 6/2012 Frank ................. G09C 5/00
726/2
8,316,310 B2 * 11/2012 Champion ........... G06F 21/316
709/203

(Continued)

FOREIGN PATENT DOCUMENTS

JP 2000-099471 4/2000
JP 2007-264929 10/2007

OTHER PUBLICATIONS

Mohammad Shirali-Shahreza et al., "Dynamic CAPTCHA," IEEE Int'l Symp. on Communications and Information Technoloe, ies, pp. 436-440 (Oct. 2008).*

(Continued)

*Primary Examiner* — Farid Homayounmehr
*Assistant Examiner* — Sanchit Sarker
(74) *Attorney, Agent, or Firm* — Klarquist Sparkman, LLP

(57) ABSTRACT

[Problem] To selectively provide, in accordance with a user terminal a CAPTCHA that can be easily executed by an operator of the user terminal. [Solution] A web server (11) determines the type of web browser running in a user terminal (13). An authentication server (12) decides a CAPTCHA execution program on the basis of the type of web browser that has been determined. The authentication server (12) executes the decided CAPTCHA execution program to generate problem data and correct answer data. The web server (11) provides the CAPTCHA to the user terminal (13) on the basis of the problem data. The authentication server (12) compares the correct answer data and answer data generated by the user terminal (13), and determines whether authentication has succeeded or failed.

19 Claims, 11 Drawing Sheets

(58) Field of Classification Search
USPC .......................................................... 726/7
See application file for complete search history.

(56) References Cited

U.S. PATENT DOCUMENTS

| | | | | | |
|---|---|---|---|---|---|
| 8,397,275 | B1* | 3/2013 | Magdsick | ............... | G06F 21/31 380/200 |
| 8,417,791 | B1* | 4/2013 | Peretz | ................ | H04L 63/08 379/201.02 |
| 8,752,141 | B2* | 6/2014 | Gross | ................ | A63F 13/12 726/5 |
| 2009/0113294 | A1* | 4/2009 | Sanghavi | ............. | G06F 17/211 715/269 |
| 2009/0138723 | A1* | 5/2009 | Nyang | ................ | G06F 21/36 713/182 |
| 2009/0328163 | A1* | 12/2009 | Preece | ................ | G06F 21/36 726/5 |
| 2010/0031287 | A1* | 2/2010 | Simon | ................ | G06Q 30/02 725/38 |
| 2011/0208716 | A1* | 8/2011 | Liu | ................ | G06F 17/30247 707/710 |
| 2014/0082694 | A1* | 3/2014 | Sanghavi | ................ | G06F 21/31 726/3 |
| 2014/0250538 | A1* | 9/2014 | Rapaport | ................ | G06F 21/31 726/28 |
| 2015/0143495 | A1* | 5/2015 | Okada | ................ | G06F 21/31 726/7 |
| 2016/0055329 | A1* | 2/2016 | Akula | ................ | G06F 21/36 726/7 |
| 2016/0191505 | A1* | 6/2016 | Frank | ................ | G09C 5/00 726/7 |

OTHER PUBLICATIONS

Okada et al., "User-friendly Digital Watermark Extraction using Semi-transparent Image," *IEEE Consumer Communications and Networking Conf.*, pp. 834-835 (Jan. 2011).

Shirali-Shahreza et al., "Dynamic CAPTCHA," *IEEE Int'l Symp. on Communications and Information Technologies*, pp. 436-440 (Oct. 2008).

Supplementary European Search Report dated Aug. 6, 2015, from European Patent Application No. 12864090.1, 8 pp.

International Search Report dated Jan. 31, 2012, from International Patent Application No. PCT/JP2012/050202, 1 p.

* cited by examiner (A)

(B)

41

| WEB BROWSER No | TERMINAL CLASSIFICATION | CAPTCHA No_1 | CAPTCHA No_2 | CAPTCHA No_3 |
|---|---|---|---|---|
| 001 | PC | 001 | 002 | 003 |
| 002 | PC | 001 | 002 | 004 |
| 003 | PC | 001 | 003 | 004 |
| 004 | MB | 001 | NULL | NULL |
| 005 | MB | 001 | NULL | NULL |

(A)

42

| WEB BROWSER No | FIRST IMAGE VERTICAL SIZE | FIRST IMAGE HORIZONTAL SIZE | SECOND IMAGE VERTICAL SIZE | SECOND IMAGE HORIZONTAL SIZE |
|---|---|---|---|---|
| 001 | 400 | 300 | 100 | 100 |
| 002 | 500 | 300 | 200 | 100 |
| 003 | 600 | 600 | 250 | 250 |
| 004 | 100 | 100 | 50 | 50 |
| 005 | 150 | 150 | 70 | 70 |

CAPTCHA PROVISION METHOD AND PROGRAM

CROSS REFERENCE TO RELATED APPLICATIONS

This application is the U.S. National Stage of International Application No. PCT/JP2012/050202, filed Jan. 6, 2012.

TECHNICAL FIELD

The present invention relates to a method and program whereby a server provides an authentication CAPTCHA to a user terminal.

BACKGROUND ART

In computer networks such as the internet, computers that are run by malicious programs and that automatically access servers pose a problem. Such computers automatically execute processes presumed to be originally human-operated, such as automatically acquiring or logging into various accounts provided by a server.

A CAPTCHA (Completely Automated Public Turing test to tell Computers and Humans Apart) is used for the server to determine whether or not the user terminal is being operated by a human. A CAPTCHA is a test which a server makes a user terminal execute, and is easy for a human to answer correctly but difficult for a program to answer correctly. Based on the answer from the user terminal, the server determines whether the answerer is a user terminal operator or a program running in the user terminal.

An image is displayed on a display screen of the user terminal and the image is used as the CAPTCHA. Known examples of CAPTCHAs that use an image include those disclosed in Patent References 1 to 3. Patent Reference 1 discloses a method in which problem text is displayed as an image and a user inputs an answer to the problem text by manual input. Patent Reference 2 discloses a method of displaying a subject image and a processed image which is a predetermined image process added to the subject image, and simultaneously displaying problem text relating to these images. Patent Reference 3 discloses a method of displaying an animation and having the user input text partially shown within the animation.

PRIOR ART REFERENCES

Patent References

Patent Reference 1: Japanese patent application laid-open publication No. 2009-266067
Patent Reference 2: Japanese patent application laid-open publication No. 2010-67096
Patent Reference 3: Japanese patent application laid-open publication No. 2008-52727

SUMMARY OF THE INVENTION

Problems to be Solved by the Invention

CAPTCHAs employed via the internet are often premised on being executed by a personal computer. However, because the display screen size, the display screen resolution, and the input method differ depending on the user terminal, it is sometimes difficult to execute the CAPTCHA. This problem is likely to be encountered particularly in cases in which the CAPTCHA is executed by a mobile terminal.

The present invention was made in view of the problems described above, and an object thereof is to selectively provide, in accordance with a user terminal, a CAPTCHA that can be easily executed by the user terminal operator.

(1) The present invention is a method whereby a server provides a authentication CAPTCHA to a user terminal in a computer network configured at least from the server and the user terminal which is provided with a display screen and input means, the CAPTCHA provision method comprising: a web browser determination step in which the server determines the type of web browser run in the user terminal; a CAPTCHA deciding step in which the server decides one of a plurality of CAPTCHA execution programs for executing mutually different CAPTCHAs in the web browser of the user terminal on the basis of the determined type of web browser, the CAPTCHA execution programs being stored in the server; a CAPTCHA execution step in which the server executes the decided CAPTCHA execution program and causes the web browser of the user terminal to execute the CAPTCHA; and an authentication result determination step in which the server determines whether or not authentication has succeeded on the basis of answer data that the user terminal has generated according to the executed CAPTCHA.

The server in the present invention is a computer, and the server conducts communication with the user terminal on the basis of a request from the user terminal. The server may be a grouping of a plurality of devices connected to each other in a communicable manner by a wired or wireless method. The user terminal is a computer and is operated by a user via the input means. The display screen and the input means may be configured integrally with the user terminal, or they may be configured as different devices.

With this configuration, the CAPTCHA execution program is decided and a CAPTCHA is provided based on the type of web browser of the user terminal. Therefore, an optimal CAPTCHA can be provided to the user terminal.

(2) The server may determine in the web browser determination step whether the web browser run in the user terminal is run in a personal computer or run in a mobile terminal, and may decide in the CAPTCHA deciding step to execute an image CAPTCHA execution program as the CAPTCHA execution program when having determined the web browser to be run in a mobile terminal. The CAPTCHA execution step when an image CAPTCHA execution step is executed comprises: an image deciding step in which the server decides one image set having a plurality of images; an image display step in which the server causes the plurality of images included in the decided image set to be displayed in an image display from the display screen as defined by the web browser; and an image movement step in which the server puts image movement input and answer input from the input means into a state that the user terminal can receive, and causes at least one of the plurality of images to move relatively in the image display area on the basis of the received image movement input. The authentication result determination step when the image CAPTCHA execution step is executed is a step in which the server determines whether or not the answer data indicating the relative position of the plurality of images when the answer input is received satisfies a condition stored in the server, the server determining that authentication has succeeded when the condition is satisfied and that authentication has failed when the condition is not satisfied.

The term "personal computer" in the present invention includes desktop PCs, workstations, and the like. The mobile terminal is an information terminal primarily premised on being used portably by an operator, and this term includes smartphones, smartbooks, tablet PCs, PDAs (personal digital assistants), and the like.

With this configuration, when the user terminal is a mobile terminal, the image CAPTCHA execution program is executed and a CAPTCHA is provided to the user terminal. In this case, the user causes a plurality of images displayed on the display screen to be moved relatively by operating the input means (image movement input). The user also decides the relative position of the images by a different operation (answer input). Only when the decided relative position satisfies a condition does the server determine that authentication has succeeded. There is no need for the operator of the user terminal to perform operations such as inputting text, and the operator need only move the displayed images. Therefore, the CAPTCHA can be easily completed even with a mobile terminal.

(3) The server may, in the authentication result determination step when the image CAPTCHA execution program is executed, calculate the difference between the relative position of the plurality of images indicated by the answer data and the relative position indicated by correct answer data stored in the server, and the server may determine whether or not the authentication has succeeded on the basis of whether or not the absolute value of the difference is less than the threshold stored in the server.

With this configuration, a determination of whether or not authentication has succeeded is performed based on whether or not the deviation between the relative position indicated by the answer data and the relative position indicated by the correct answer data is within a threshold range.

(4) The image set and the correct answer data may be generated by the server in the image deciding step, and the vertical and horizontal size of the plurality of images included in the image set may be decided based on the type of web browser determined by the web browser determination step.

With this configuration, the images are generated after the type of web browser has been determined. The vertical and horizontal size of the generated images is decided based on the determined type of web browser.

(5) The image set may include one image representing an animal/plant or a man-made object, and at least one image that either incorporates the animal/plant or man-made object, is attached to the animal/plant or man-made object, or represents something that is food for the animal/plant.

(6) The animal/plant or man-made object may be a human, a humanoid robot, a mammal other than a human, or a vehicle.

(7) The image set may include one image shown with part of a first original image missing, and at least one image that has a brightness value corresponding to the missing part and that restores the first original image by being placed in the missing part.

(8) The image set may include a first image and a second image, at least one of which has a secret image embedded in a visually indiscernible form. When the first image and the second image are in a relative position shown by the correct answer data, the secret image is included in at least part of an image obtained by totaling the brightness values of the corresponding pixels of the first image and the second image in an overlapping area where the first image and the second image overlap each other. In the image display step, the server outputs the total of the brightness values of the corresponding pixels of the first image and the second image in the overlapping area to the display screen as the brightness value of the overlapping area.

With this configuration, when the first image and the second image are in a relative position shown by the correct answer data, a secret image is displayed in part of the overlapping area.

The secret image being visually indiscernible means that the secret image cannot be discerned merely by viewing the displayed first image and second image individually. With this configuration, it is preferable that the user can recognize that a secret image is displayed in the overlapping area, and there is no need for the brightness value of the secret image to be completely restored before the secret image is embedded.

(9) The first image may be an image generated from a second original image, and also may be an image subjected to zero or more of the following three processes: an embedding process of embedding the secret image in the image by using a numerical value based on the brightness value of the secret image to convert the brightness value of the area where the secret image is embedded, compared to before the embedding of the secret image; an inversion process of inverting the brightness value of the image; and a semitransparency process of making the image semitransparent. The second image may be an image generated from the second original image, and also may be an image subjected to any processes that of the three said processes were not performed on the first image.

(10) The computer network may be the internet, and the server may have a first server device for telecommunicating with the user terminal, and a second server device for executing at least the authentication result determination step by telecommunicating with the first server device.

As in this configuration, the server device for telecommunicating with the user terminal and the server device for making determinations of the authentication results may be separate.

(11) The present invention is a program run in a server in order for the server to provide a authentication CAPTCHA to a user terminal in a computer network configured at least from the server and the user terminal which is provided with a display screen and input means, the program comprising: a web browser determination function for causing the server to execute a process for determining the type of web browser run in the user terminal; a CAPTCHA deciding function for causing the server to execute a process of deciding one of a plurality of CAPTCHA execution programs for executing mutually different CAPTCHAs in the web browser of the user terminal on the basis of the determined type of web browser, the CAPTCHA execution programs being stored in the server; a CAPTCHA execution function for causing the server to execute a process for executing the decided CAPTCHA execution program and causing the web browser of the user terminal to execute the CAPTCHA; and an authentication result determination function for causing the server to execute a process in which the server determines whether or not authentication has succeeded on the basis of answer data that the user terminal has generated according to the executed CAPTCHA.

In order to carry out the present invention, a program such as the one described above may be executed in the server.

(12) The present invention is a method whereby a server provides a authentication CAPTCHA to a user terminal in a computer network configured at least from the server and the user terminal which is provided with a display screen and input means, the CAPTCHA provision method comprising:

an image deciding step in which the server decides one image set having a plurality of images; an image display step in which the server causes the plurality of images included in the decided image set to be displayed in an image display area defined in the display screen; an image movement step in which the server puts image movement input and answer input from the input means into a state that the user terminal can receive, and causes at least one of the plurality of images to move relatively in the image display area on the basis of the received image movement input; and an authentication result determination step in which the server determines whether or not the relative positions of the images when the answer input was received satisfy a condition stored in the server, the server determines that authentication has succeeded when the condition is satisfied, and the server determines that authentication has failed when the condition is not satisfied.

As described above, a CAPTCHA that uses an image set may be executed without performing a browser determination.

(13) The present invention is a program run in a server in order for the server to provide a authentication CAPTCHA to a user terminal in a computer network configured at least from the server and the user terminal which is provided with a display screen and input means, the program comprising: an image deciding function for causing the server to execute a process of deciding one image set having a plurality of images; an image display function for causing the server to execute a process of displaying the plurality of images included in the decided image set in an image display area defined on the display screen; an image movement function for causing the server to execute a process of putting image movement input and answer input from the input means into a state that can be received by the user terminal, and a process of moving at least one of the plurality of images relatively within the image display area on the basis of the received image movement input; and an authentication result determination function for causing the server to execute a process of determining whether or not the relative positions of the images when the answer input was received satisfy a condition stored in the server, determining that authentication has succeeded when the condition is satisfied, and determining that authentication has failed when the condition is not satisfied.

A program such as the one described above may be executed in order to execute a CAPTCHA that uses an image set without performing a browser determination.

Advantages of the Invention

According to the present invention, a CAPTCHA that can easily be executed by a user terminal operator can be selectively provided according to the user terminal.

BRIEF DESCRIPTION OF THE DRAWINGS

FIG. 2(A) is a table showing an example of a first data table 41. FIG. 2(B) is a table showing an example of a second data table 42.

BEST MODE FOR CARRYING OUT THE INVENTION

Embodiments of the present invention are described below with reference to the drawings as appropriate. The embodiments described below are merely examples of the present invention, and needless to say, the embodiments of the present invention can be altered as appropriate within a range that does not alter the scope of the present invention.

[Authentication System 10]

Figure 1:
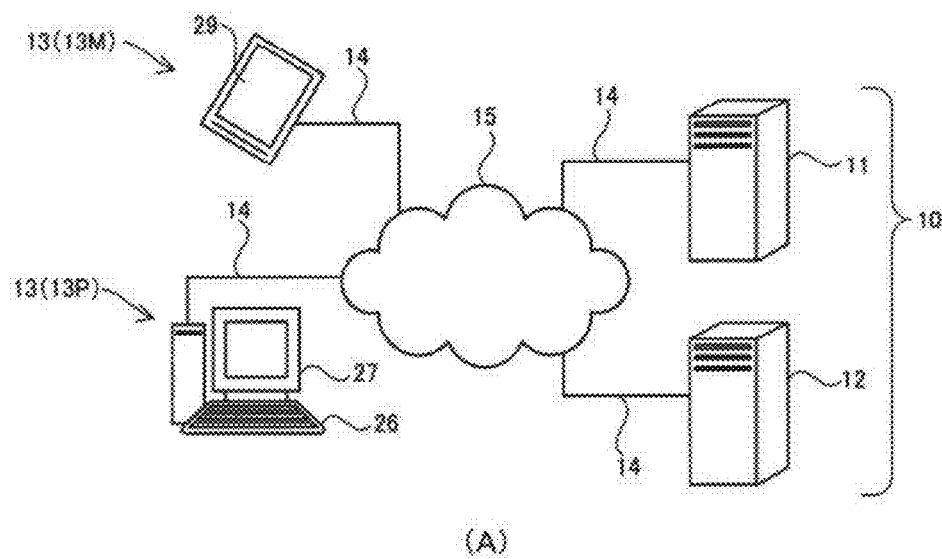
FIG. 1(A) is a drawing showing the manner in which the authentication system 10 and the user terminal 13 according to an embodiment of the present invention are connected via the internet 15.
FIG. 1(B) is a block diagram showing the hardware configuration shared by the web server 11, the authentication server 12, and the personal computer 13P.
Figure 1:
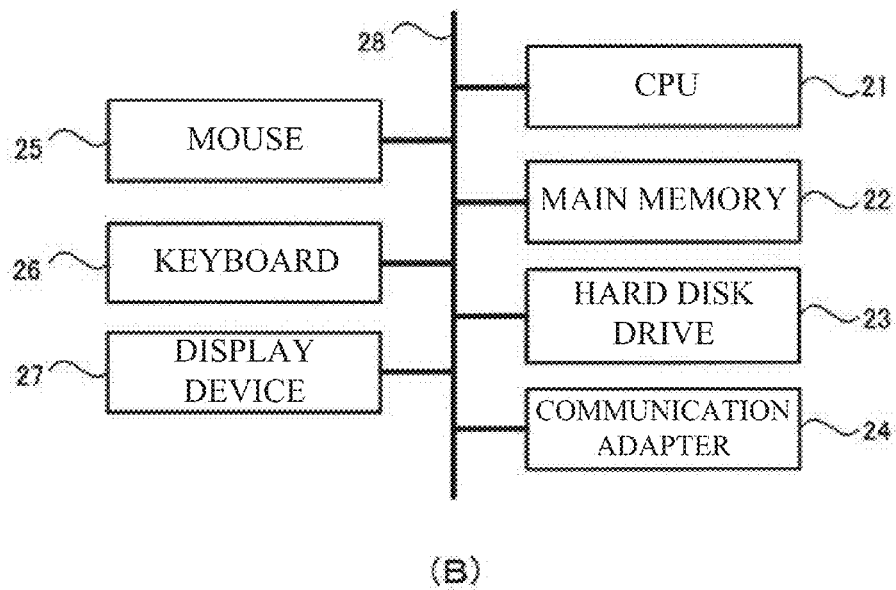

The authentication system 10 is configured from a web server 11, an authentication server 12, and the like, as shown in FIG. 1(A). These servers are both connected to the internet 15 via communication lines 14. The web server 11 and the authentication server 12 may be connected to the internet 15 via the same LAN (Local Area Network) or WAN (Wide Area Network), or they may be connected to the internet 15 via different networks. The communication lines 14 may be actualized by a wireless method.

The web server 11 and the authentication server 12 together are one example of the server of the present invention. The web server 11 is an example of the first server device of the present invention. The authentication server 12 is an example of the second server device of the present invention. The internet 15 is an example of the computer network of the present invention.

[Web Server 11]

The web server 11 telecommunicates with the user terminal 13 connected to the internet 15 via a communication line 14. Accessed by the user terminal 13, the web server 11 establishes a TCP (transmission control protocol) connection with the user terminal 13. In this state, based on protocols such as HTTP (hypertext transfer protocol), the web server 11 provides HTML (hypertext markup language) code, image data, and the like constituting a web page to the web browser running in the user terminal 13. The HTML code is deciphered by the web browser and the web page is displayed on the display screen of the user terminal 13. The user terminal 13 accessing the web server 11 is classified as either a personal computer 13P or a mobile terminal 13M.

A program for authenticating the user terminal 13 (referred to below as a first authentication program) is installed in the web server 11. When the user terminal 13 accesses a predetermined URL (uniform resource locator) required by the authentication, the web server 11 executes the first authentication program. The web server 11 cooperates with the authentication server 12 to authenticate the user terminal 13. In other words, the web server determines whether or not to allow the user terminal 13 to access the URL. The series of processes whereby the web server 11 and the authentication server 12 authenticate the user terminal 13 is termed as the authentication action. The details of the authentication action are described below.

An outline of the hardware configuration of the web server 11 is shown in FIG. 1(B). In the web server 11, a CPU 21 (central processing unit), main memory 22, a hard disk drive 23, a communication adapter 24, a mouse 25, a keyboard 26, a display device 27, and the like are connected with a bus 28 via various controllers (not shown). In other words, the constituent members are connected to each other via the bus 28. Shown herein is the minimum configuration, and components not necessary to describing the present embodiment are omitted.

Installed in the hard disk drive 23 are various programs needed to actualize the functions of the web server 11, including the first authentication program described above. These programs are loaded in the main memory 22 and executed by the CPU 21 as necessary. The web server 11 is also connected with the internet 15 via the communication adapter 24. A manager of the web server 11 can perform settings and operations with the web server 11 using the mouse 25 and the keyboard 26, while confirming the display on the display device 27. Alternatively, the web server 11 may be configured so that setting and operations can be performed via a different terminal. The constituent members constituting the web server 11 are publically known and detailed descriptions of such members are therefore not given.

The hardware configuration of the authentication server 12 and the personal computer 13P is the same as the configuration in FIG. 1(B). Constituent members having different properties are implemented depending on the processing capability of each of the constituent members. A large part of the hardware configuration of the mobile terminal 13M is the same as the configuration of FIG. 1(B). The differences with the configuration of FIG. 1(B) are that a touch panel display 29 (FIG. 1(A)) is provided instead of the mouse 25, keyboard 26, and display device 27, and a nonvolatile flash memory (not shown) is provided instead of the hard disk drive 23. The touch panel display 29 is a transparent electrostatic or pressure-sensitive sensor pad placed on top of a liquid crystal or organic EL display screen. The touch panel display 29 is conventionally known and a detailed description is therefore not given. A plurality of each of the constituent members may be provided as necessary.

The screen provided to the display device 27 of the user terminal 13 and the touch panel display 29 are examples of the display screen of the present invention, and the mouse 25 and keyboard 26 of the user terminal 13, as well as the touch panel display 29, are examples of the input means of the present invention.

[Authentication Server 12]

The authentication server 12 performs authentication of the user terminal 13 in cooperation with the web server 11. The authentication server 12 activates with the installation of a second authentication program that pairs with the first authentication program. Based on the first authentication program and the second authentication program, the web server 11 and the authentication server 12 convert the data needed to authenticate the user terminal 13 and execute the authentication action. The authentication server 12 can be actualized with the same hardware configuration as the web server 11, and a detailed description is therefore not given.

A first data table 41 is stored in the hard disk drive 23 of the authentication server 12. An example of the first data table 41 is shown in FIG. 2(A). The first data table 41 is a table that correlates the type of web browser running in the user terminal 13 and the executed CAPTCHA. The "Web Browser No" is a value assigned to each type of web browser and is unique in the entire first data table 41. The column "terminal classification" shows the types of user terminals 13 determined from the web browser. "PC" indicates that the user terminal 13 is a personal computer 13P. "MB" indicates that the user terminal 13 is a mobile terminal 13M. The columns "CAPTCHA No_1," "CAPTCHA No_2," and CAPTCHA No_3" show the CAPTCHA numbers assigned to the CAPTCHAs provided to the web browsers of the respective user terminals 13. "NULL" indicates that no value is stored.

In the hard disk drive 23 of the authentication server 12 are stored a plurality of CAPTCHA execution programs which run as sub-programs of the second authentication program, and which are for providing CAPTCHAs based on mutually different algorithms to the user terminal 13. The CAPTCHA execution programs correspond to the different respective CAPTCHA numbers.

When the web browser number is 001, for example, the user terminal 13 is determined to be a personal computer 13P, and a CAPTCHA execution program corresponding to any of the CAPTCHA numbers 001, 002, or 003 is randomly executed. When the web browser number is 004, the user terminal 13 is determined to be a mobile terminal 13M, and the CAPTCHA execution program corresponding to the CAPTCHA number 001 is executed. According to the example of FIG. 2(A), when the user terminal 13 is a mobile terminal 13M, the CAPTCHA execution program corresponding to the CAPTCHA number 001 is inevitably executed. The CAPTCHA execution program is for providing an image CAPTCHA that uses an image to the user terminal 13. The CAPTCHA execution program of the CAPTCHA number 001 is termed in particular as the image CAPTCHA execution program.

A second data table 42 is stored in the hard disk drive 23 of the authentication server 12. An example of the second data table 42 is shown in FIG. 2(B). The second data table 42 is referenced by the image CAPTCHA execution program, and is a table for correlating the "web browser No" described above and the vertical and horizontal sizes of the first image 32 (FIG. 3(B)) and second image 33 (FIG. 3(C)) used in the CAPTCHA. The vertical and horizontal size is the number of pixels in the vertical direction and the horizontal direction of the image. The columns "first image vertical size," "first image horizontal size," "second image vertical size," and "second image horizontal size" show the vertical and horizontal sizes of the first image 32 and the second image 33. The image CAPTCHA execution program decides the vertical and horizontal sizes of the first image 32 and the second image 33 used in the CAPTCHA by referencing the second data table 42. The details are described hereinafter.

Figure 3:
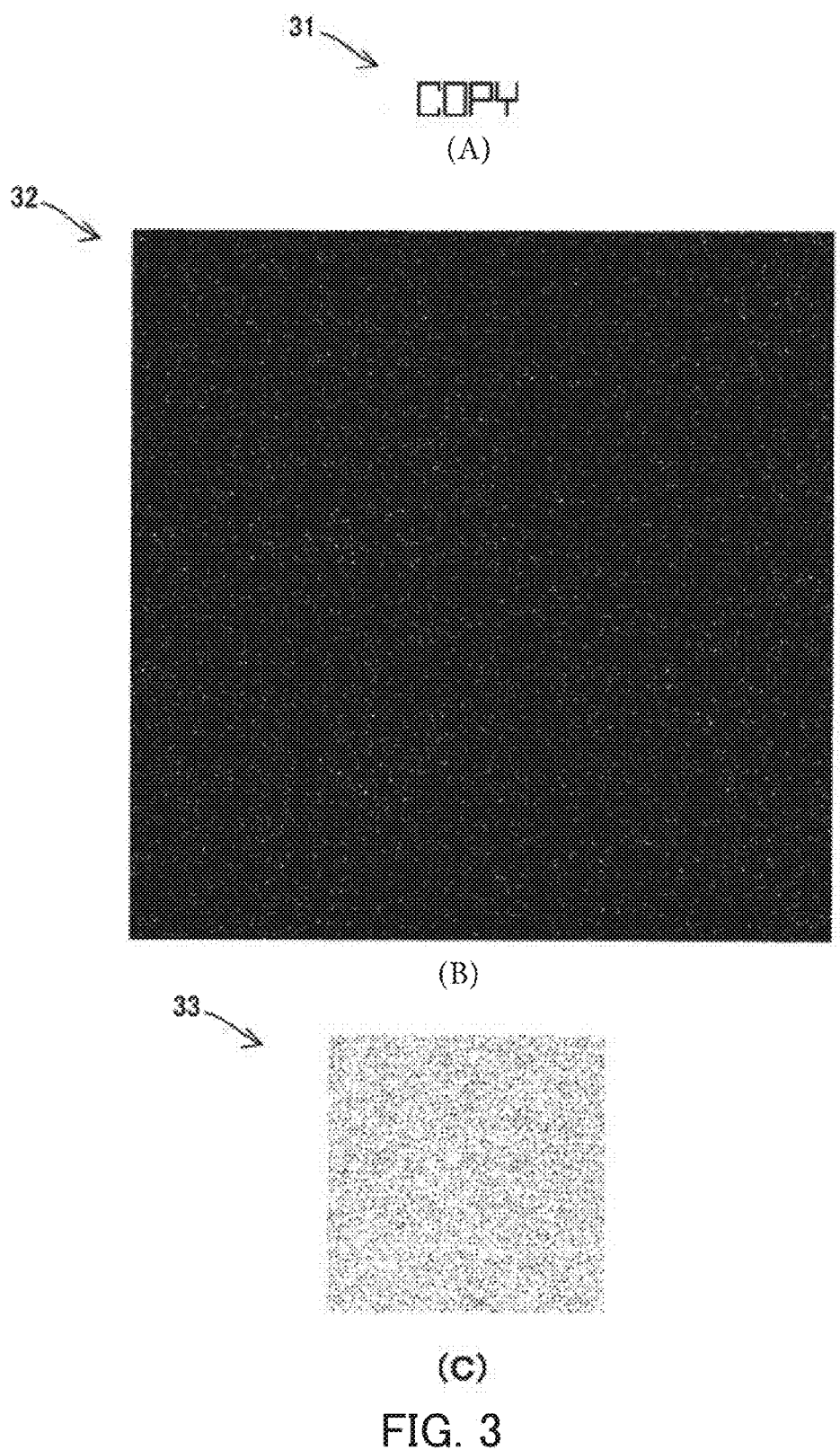
FIG. 3(A) is a view showing an example of a secret image 31.
FIG. 3(B) is a view showing an example of a first image 32.
FIG. 3(C) is a view showing an example of a second image 33.

A plurality of secret images 31 used to generate the first image 32 and the second image 33 are stored in the hard disk drive 23. An example of a secret image 31 is shown in FIG. 3(A). The secret image 31 is a two-dimensional digital image, and in the present embodiment, the secret image is a grayscale image. In the example in FIG. 3(A), the secret image 31 is an image of the text string "COPY," but the secret image 31 may be something different. For example, the secret image 31 may be an image of a different text string than the word "COPY." The secret image 31 may be an image of any arbitrary natural object or man-made object. In other words, when the secret image 31 is recognized by a human, the secret image may be anything as long as it is an image from which a human can find some kind of meaning. The secret image 31 is referenced by the second authentication program, and the first image 32 (FIG. 3(B)) and second image 33 (FIG. 3(C)) used in authentication are generated. The details are described hereinafter. The first image 32 and the second image 33 together constitute an example of the image set of the present invention.

The first data table 41 and the second data table 42 of FIG. 2 are shown in the form of a relational database, but the notation therein is merely for the sake of convenience. In other words, the first data table 41 and the second data table 42 may be actualized in any format as long as they are capable of correlating the web browsers and various types of information. For example, these correlations may be stored as text strings in data files preserved in the hard disk drive 23, or they may be stored as part of the code of the second authentication program or the image CAPTCHA execution program.

Below is a description of the procedure of the authentication action executed by the web server 11 and the authentication server 12 on the basis of the first authentication program and the second authentication program. First is a description of the procedure of a common authentication action shared by all of the CAPTCHAs, after which is a more detailed description of the authentication action when a CAPTCHA, i.e. the image CAPTCHA of the CAPTCHA number 001 is provided.

[Procedure of Authentication Action Shared by all CAPTCHAs]

Figure 4:
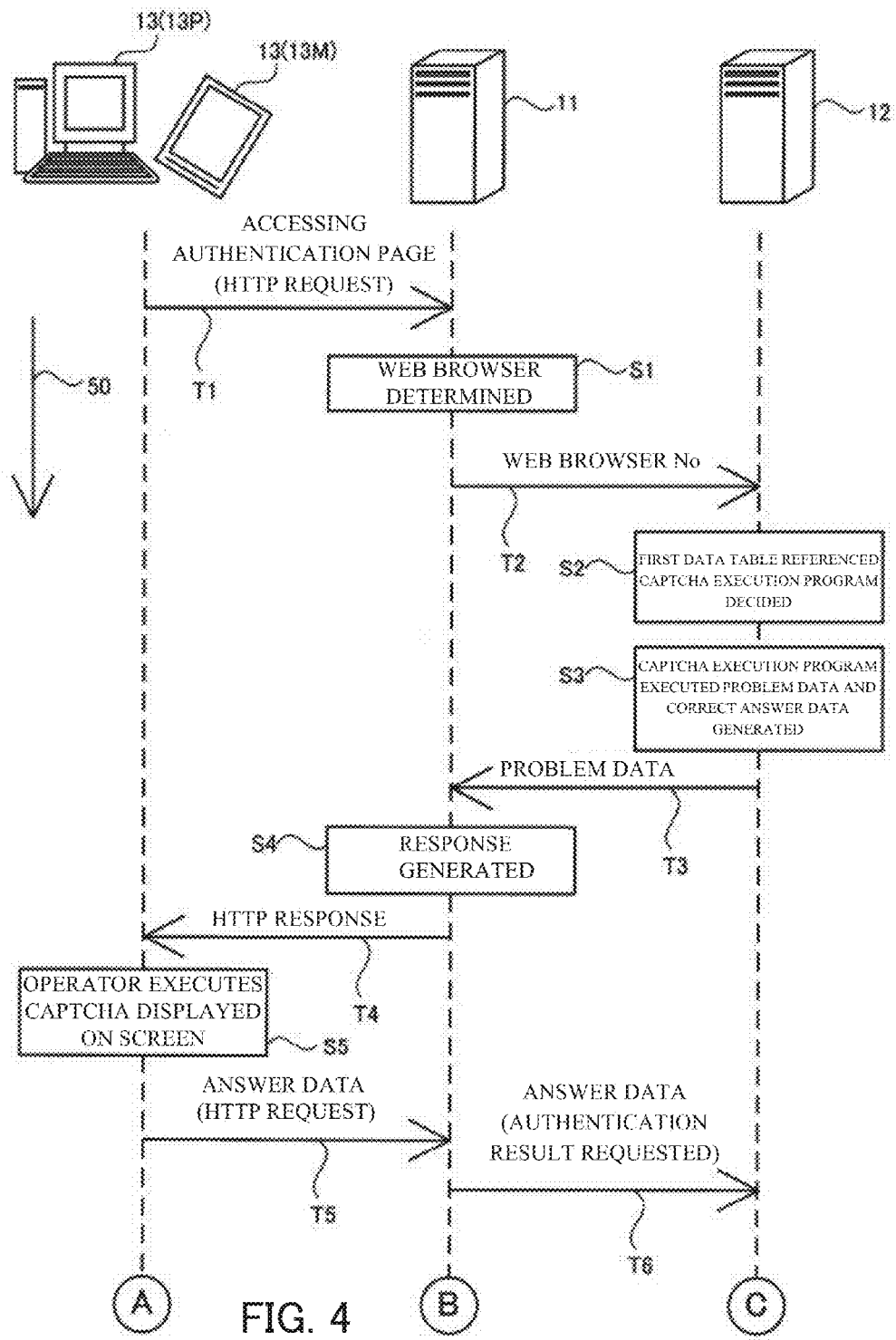
FIG. 4 is the first half of a sequence chart in which the process and communication executed by the web server 11, the authentication server 12, and the user terminal 13 for the authentication action are shown in chronological order.
Figure 5:
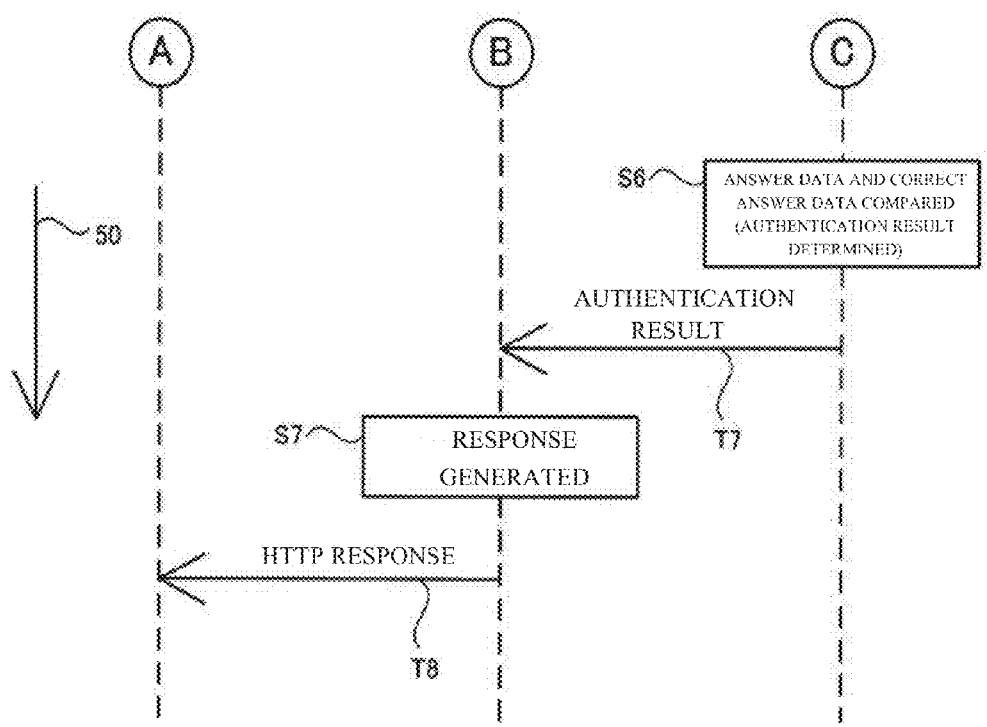
FIG. 5 is the second half corresponding to the sequence chart of FIG. 4. The sections "A," "B," and "C" shown inside the circles in FIG. 5 correspond to sections "A," "B," and "C" shown inside the circles in FIG. 4.

FIGS. 4 and 5 are sequence charts in which the various processes and communications conducted by the web server 11, the authentication server 12, and the user terminal 13 are shown in chronological order. The arrow 50 indicates the direction of time progression. In the processes and communications shown in FIGS. 4 and 5, only parts necessary to describing the present embodiment are shown. Many more processes and communications that are associated with these processes and communications may be performed.

In the description below, the process of S1 is an example of the web browser determination step of the present invention. The process of S2 is an example of the CAPTCHA deciding step of the present invention. The processes S3 and S4 and the communication of T4 are examples of CAPTCHA execution steps of the present invention. The process of S6 is an example of the authentication result determination step of the present invention.

The operator of the user terminal 13 performs a predetermined operation in the web browser in order to cause the web page provided by the web server 11 to be displayed on the display device 27 or the touch panel display 29. This operation is an operation of inputting and deciding a URL in the address bar of the web browser, an operation of mouse-clicking a link for moving from a different web page or the like to the URL or touching the link on the touch panel display 29, or another operation, for example.

When a TCP connection has not been established between the user terminal 13 and the web server 11, the user terminal 13 sends a TCP connection request to the web server 11. The user terminal 13 and the web server 11 establish a TCP connection by a method such as a three-way handshake, for example. With the TCP connection established, the user terminal 13 transmits an HTTP request corresponding to the URL of the web page to the web server 11 via the web browser (T1). The user terminal 13-web server 11 communication and the web server 11-authentication server 12 communication may be encoded by a method such as RSA (Rivest Shamir Adleman). FIGS. 4 and 5 omit various processes and communications necessary to coded communication, such as generating and converting a public key.

When accessing the requested URL requires authentication by CAPTCHA, the web server 11 starts the first authentication program. Based on the first authentication program, the user terminal 13 executes a process for determining the type of web browser run in the user terminal 13 (S1). This determination can be carried out by any publically known method. As one example, the determination can be made based on the User-Agent header included in the HTTP client. The determined type of web browser is converted to the web browser number described above.

The web server 11 establishes a TCP connection with the authentication server 12, similar to the above description. In this state, the web server 11 transmits a packet including information of the web browser number to the authentication server 12 (T2).

Using the web browser number transmitted from the web server 11 as a key, the authentication server 12 references the first data table 41. Based on the CAPTCHA number correlated with the web browser number, the authentication server 12 decides the CAPTCHA execution program to be executed (S2).

The authentication server 12 generates problem data and correct answer data on the basis of the CAPTCHA execution program, and stores this data in the main memory 22. The problem data is data that includes various information for the web server 11 to provide a CAPTCHA to the user terminal 13. Specifically, this information includes objects such as program code needed in order for the web server 11 to create an HTTP response for providing a CAPTCHA, and images used in the CAPTCHA. The generated problem data differs with each CAPTCHA execution program. The purpose of the correct answer data is to be compared with answer data generated by the user terminal 13, and as a result of the comparison, the authentication server 12 determines whether the authentication has succeeded or failed. The generated correct answer data differs with each set of problem data.

For example, when the CAPTCHA executed involves selecting an answer to problem text from options a to d, the problem data includes data of a text string corresponding to the problem text or the options, program code needed in order to create an HTTP response displaying the problem text or the options, and the like. The correct answer data could, for example, be data showing option a, which is the correct answer.

The authentication server 12 transmits the generated problem data to the web server 11 (T3). Based on the problem data, the web server 11 generates an HTTP response and sends the response back to the user terminal 13 (S4, T4).

This HTTP response, which is deciphered by the web browser of the user terminal 13, includes HTML code for causing the user terminal 13 to execute the CAPTCHA, and the like. The operator of the user terminal 13 operates the mouse 25, the keyboard 26, or the touch panel display 29 to perform a predetermined operation required by the CAPTCHA. The user terminal 13 generates answer data according to this operation and stores the answer data in the main memory 22.

The user terminal 13 transmits an HTTP request to the web server 11 via the web browser (T5). In this HTTP request, answer data stored by the main memory 22 is included as a GET message or a POST message. Having received the HTTP request, the web server 11 generates a new packet including the answer data, transmits the packet to the authentication server 12, and requests an authentication result (T6).

The authentication server 12 compares the answer data included in the received packet and the correct answer data stored in the process of S3, and determines whether or not the authentication has succeeded (S6).

The authentication server 12 transmits the determination result of whether or not the authentication has succeeded to the web server 11 (T7). The web server 11 generates a different HTTP response depending on whether or not the authentication has succeeded and sends the response back to the user terminal 13 (S7, T8). When the authentication has succeeded, for example, the web page corresponding to the URL first requested by the user terminal in T1 is sent back as the HTTP response. When the authentication has succeeded, a web page informing the operator of the user terminal 13 that the authentication has succeeded is sent back as the HTTP response. Otherwise, the same HTTP response as in T4 may be sent back so that the operator can execute the CAPTCHA again.

In summation, the CAPTCHA number of the provided CAPTCHA is decided according to whether the user terminal 13 is a personal computer 13 or a mobile terminal 13M. According to the first data table 41 shown in FIG. 2(A), when the web browser number is 004 or 005, or in other words when the user terminal 13 is a mobile terminal 13B (*1), an image CAPTCHA (CAPTCHA number 001) will inevitably be provided. When the user terminal 13 is a personal computer 13P, sometimes an image CAPTCHA is provided, and sometimes another CAPTCHA is provided. In the example of FIG. 2(A), for example, when the web browser number is 001, any CAPTCHA corresponding to the CAPTCHA number 001, 002, or 003 is randomly provided. In other words, an image CAPTCHA is provided with a probability of 1/3.

Figure 11:
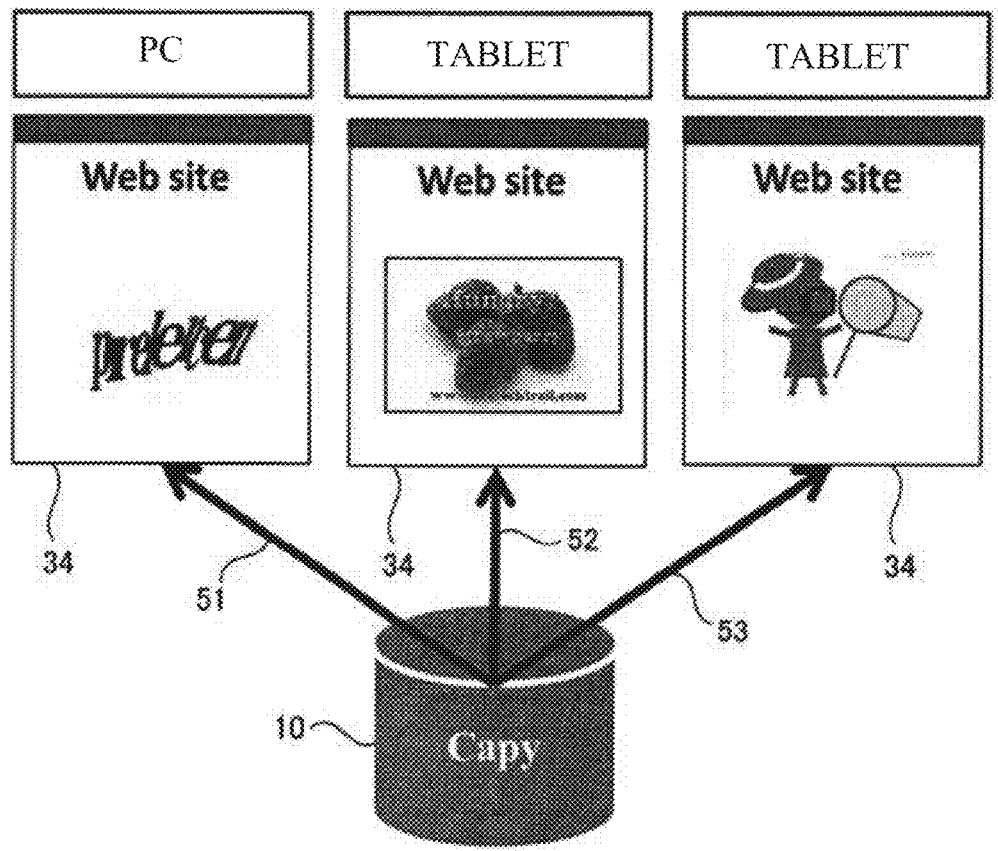
FIG. 11 is a drawing showing the manner in which any one of a plurality of CAPTCHAs are provided according to the user terminal 13.

FIG. 11 shows the manner in which different CAPTCHAs based on different CAPTCHA execution programs are provided to the user terminal 13 by the method described above. Images, text strings, and other objects are arranged within a window 34 of the web browser displayed on the display device 27 or the touch panel display 29 of the user terminal 13.

The example on the left side (corresponding to the arrow 51) shows a CAPTCHA (corresponding to any CAPTCHA number) provided when the user terminal 13 is determined to be a personal computer 13P. A random text string of the alphabet, "prelelcen," is displayed in a broken up format in the window 34, and the operator of the user terminal 13 inputs the displayed text string in an input form or the like displayed in the window 34 using the keyboard 26. In this case, the text string inputted in the input form or the like is transmitted as answer data by the communication of T5. In the process of S6, the authentication server 12 determines the authentication result by comparing the text string "prelelcen" shown by the correct answer data and the text string shown by the answer data.

Figure 8:
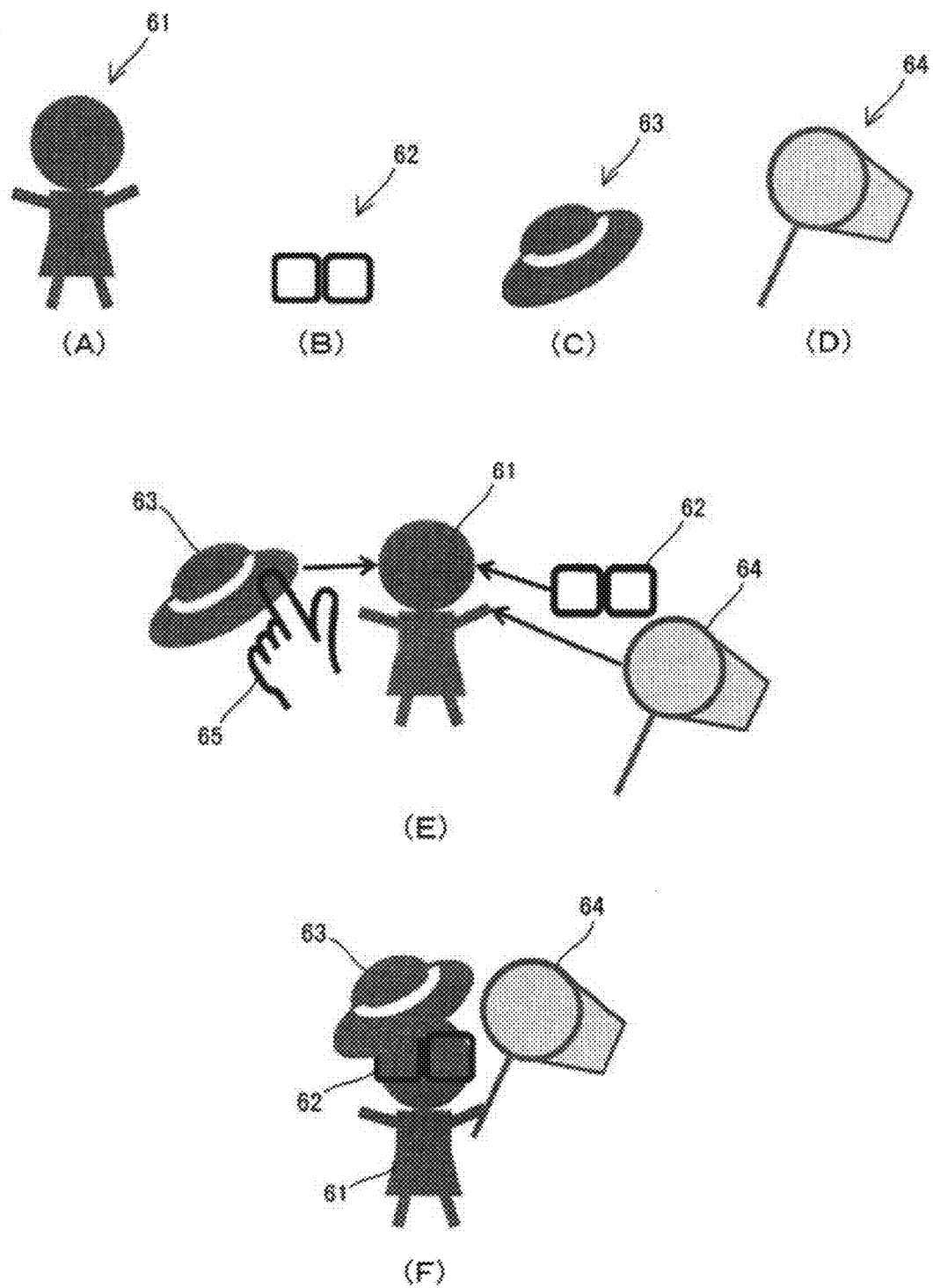
FIG. 8 is a drawing showing an example of a first image 61, a second image 62, a third image 63, and a fourth image 64 used in a modification of the present invention.
Figure 10:
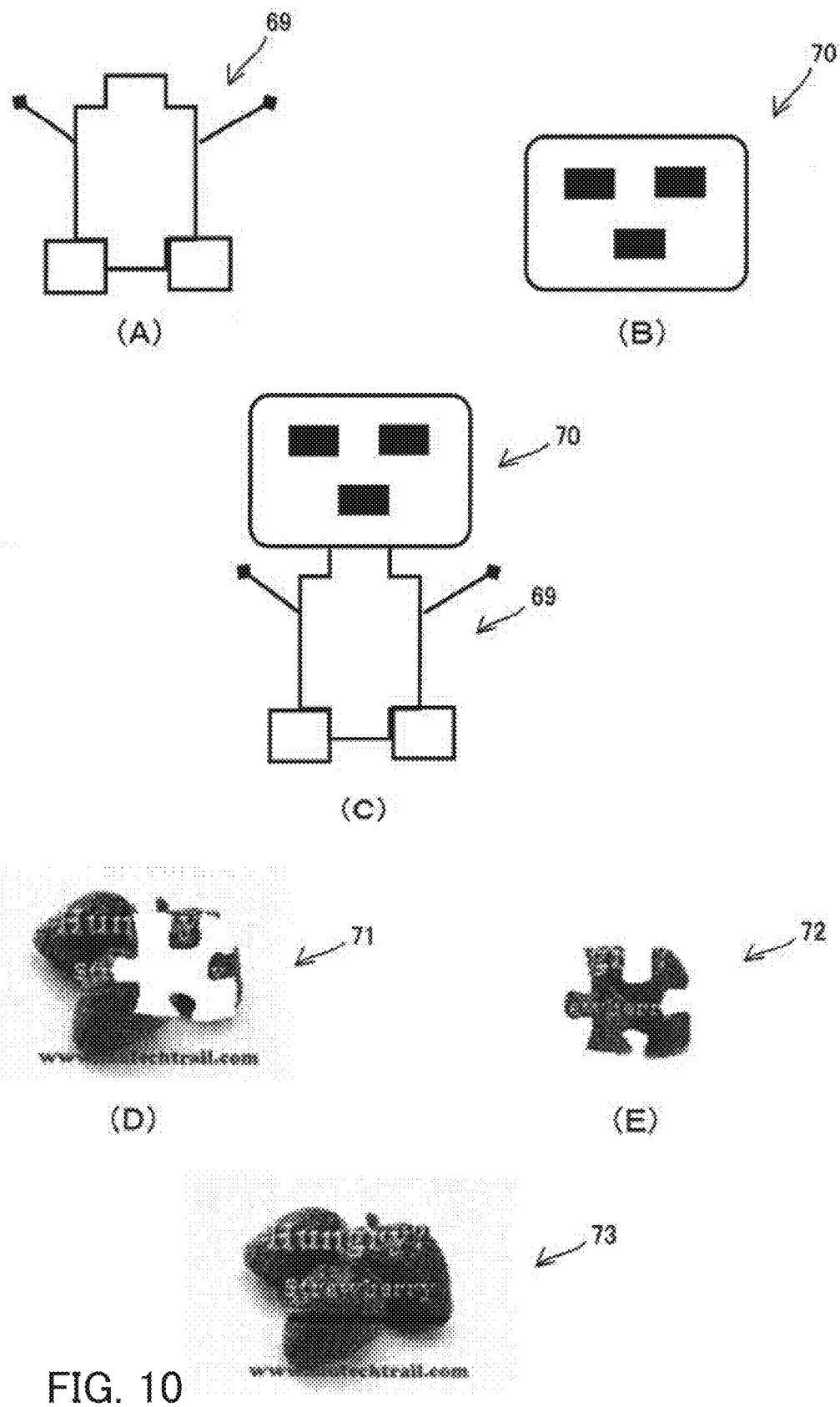
FIG. 10 is a drawing showing an example of a first image 69, a second image 70, a first image 71, and a second image 72 used in a modification of the present invention.

The middle (corresponding to the arrow 52) and the right side (corresponding to the arrow 53) show examples in which the user terminal 13 is a tablet PC. In these cases, the user terminal 13 is determined to be a mobile terminal 13M on the basis of the obtained web browser number. The middle and right-side CAPTCHAs are both provided by the image CAPTCHA execution program of the CAPTCHA number 001, but the image sets used are different. In the middle example, a first image 71 and a second image 72 (both shown in FIG. 10) are used as the image set. In the right-side example, a first image 61, a second image 62, a third image 63, and a fourth image 64 (all shown in FIG. 8) are used as the image set. Examples of image CAPTCHAs using these image sets are described in detail in modifications hereinafter.

[Procedure of Authentication Action when Image CAPTCHA is Provided]

Next is a more detailed description of the procedure of the authentication action when an image CAPTCHA with the CAPTCHA number 001 is provided. Sections that are redundant with the above description are omitted.

When the image CAPTCHA execution program is executed, the process of S3 is an example of the image deciding step of the present invention, and the process of S4 and the communication of T4 are examples of the image display step and the image movement step of the present invention.

When an image CAPTCHA with the CAPTCHA number 001 is provided in the process of S2, the image CAPTCHA execution program is executed in the process of S3. Based on the image CAPTCHA execution program, the authentication server 12 generates an image set (the first image 32 and the second image 33 here) to be used in the CAPTCHA. The authentication server 12 first refers to the second data table 42 to decide the vertical and horizontal sizes of the first image 32 and the second image 33. In the example of FIG. 2(B), assuming the web browser number is 001, for example, the first image vertical size is 400 pixels, the first image horizontal size is 300 pixels, the second image vertical size is 100 pixels, and the second image horizontal size is 100 pixels.

The authentication server 12 generates a first image 32 and a second image 33 that satisfy the decided conditions of vertical and horizontal size. The procedure of generating the first image 32 and the second image 33 is described hereinafter, and here only the properties of the first image 32 and the second image 33 are described. The first image 32 and the second image 33 are images that at a glance appear to be noise. However, a secret image 31 described above is embedded in the first image 32 and the second image 33. The secret image 31 is restored by totaling the brightness values of the corresponding pixels in a predetermined relative position where the first image 32 and the second image 33 overlap.

Figure 6:
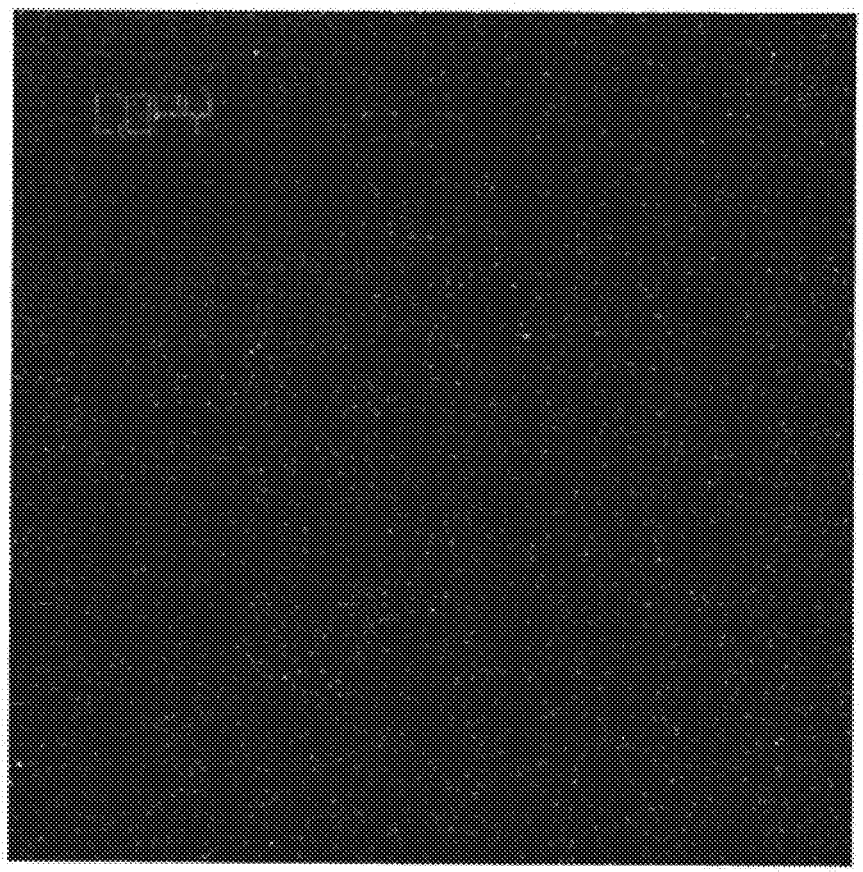
FIG. 6 is a view showing the manner in which the secret image 31 is restored from the first image 32 and the second image 33.

FIG. 6 shows the first image 32 and the second image 33 displayed as overlapping so that the upper left ends match up. The total brightness value of the two images is outputted as the brightness value of the overlapping portion between the first image 32 and the second image 33. As a result, the text string "COPY" of the secret image 31 is restored.

In the process of S3, the authentication server 12 generates the problem data described above on the basis of the first image 32 and the second image 33. Data showing the relative position (referred to as the correct answer positions below) of the first image 32 and the second image 33 when the secret image 31 is restored is designated by the authentication server 12 as the correct answer data described above.

In the process of S4, the HTTP response generated by the web server 11 on the basis of the problem data causes the user terminal 13 to execute the CAPTCHA described below.

First, the first image 32 and the second image 33 are displayed in an area (an example of the image display area of the present invention), defined by the web browser, in the display device 27 or the touch panel display 29 of the user terminal 13. The area defined by the web browser is an area in the window of the web browser that constitutes a GUI (graphical user interface), for example. The initial position where the first image 32 and the second image 33 are displayed may be decided in advance, or it may be decided randomly. The operator of the user terminal 13 can, using various input devices, move the displayed second image 33 relative to the first image 32 (S5). For example, the second image 33 may be moved by a drag operation of the mouse 25, or it may be moved by a drag operation on the touch panel display 29. The operation whereby the operator of the user terminal 13 moves the second image 33 is an example of the image movement input of the present invention.

When the first image 32 and the second image 33 are in a positional relationship of at least partially overlapping, the user terminal 13 outputs the total brightness value of the two images as the brightness value of the overlapping portion between the first image 32 and the second image 33 (an example of the overlapping area of the present invention) to the display device 27 or the touch panel display 29. When the operator has given the relative position of the first image 32 and the second image 33 as the correct answer position described above, the secret image 31 is displayed in the portion where the first image 32 and the second image 33 overlap as shown in FIG. 6. The operator, not knowing the secret image 31 in advance, performs an operation for ending the movement of the second image 33 while a meaningful image is being displayed. This operation is pressing the enter key of the keyboard 26, moving the cursor of the mouse 25 to a predetermined button displayed on the display device 27 and clicking the mouse, touching a predetermined button displayed on the touch panel display 29, or the like, for example. The screen of the display device 27 or the touch panel display 29 may display a description suggesting the above operations to the operator. The user terminal 13 calculates the relative position of the first image 32 and the second image 33 when this ending operation has been executed (referred to as the answer position below), and temporarily stores the position in the main memory 22. Data showing this answer position is answer data. The operation where by the operator of the user terminal 13 ends the movement of the second image 33 is an example of the answer input of the present invention.

The determination in the process of S6 is made by comparing the relative position (correct answer position) shown by the correct answer data and the relative position (answer position) shown by the answer data. A person skilled in the art can decide the comparison reference as desired, but one possible example is a method using a threshold. In this case, respective thresholds may be established for the horizontal relative position and the vertical relative position.

For example, with the reference pixels established, dx denoting the horizontal displacement of the second image 33 from the first image 32, and dy denoting the vertical displacement; the relative position between the images can be expressed by (dx, dy). In other words, the answer position can be expressed as $(dx_A, dy_A)$, and the correct answer position can be expressed as $(dx_T, dy_T)$. The threshold can be expressed as $(dy_B, dy_B)$. The authentication server 12 may determine that the authentication has succeeded only when the following relationships are satisfied: $|dx_A - dx_T| \leq dx_B$, and $|dy_A - dy_T| \leq dy_B$.

The number of thresholds may be limited to one. The authentication server 12 may determine that the authentication has succeeded only when the relationship $(dx_A - dx_T)^2 + (dy_A - dy_T)^2 \leq dr_B^2$ is satisfied, $dr_B$ denoting the threshold.

[Generating First Image 32 and Second Image 33]

Figure 7:
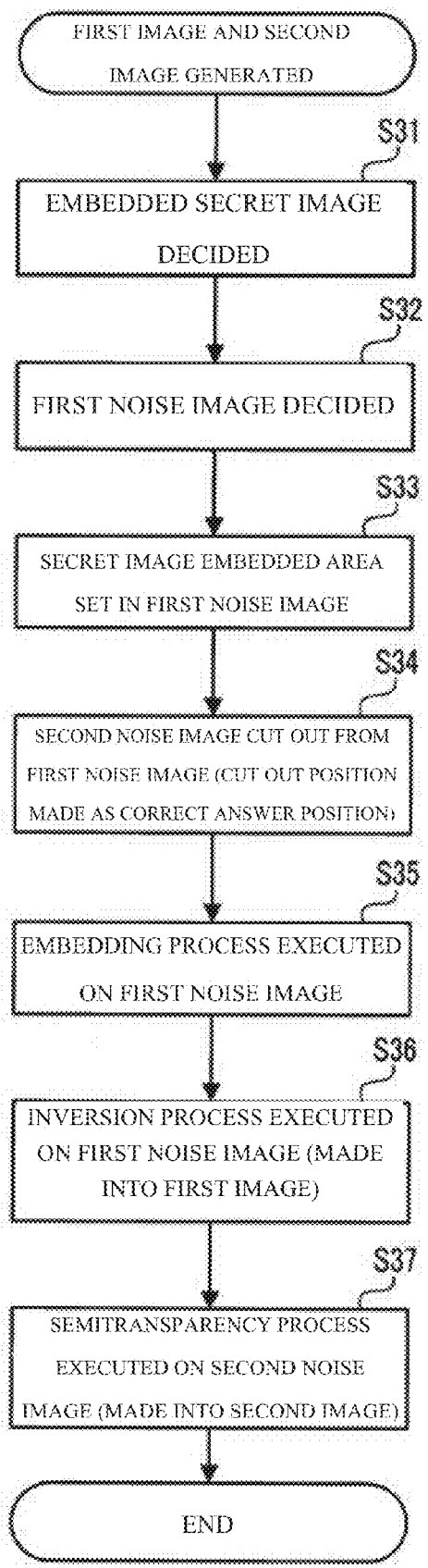
FIG. 7 s a flowchart describing the flow the process in S3 of FIG. 4, based on the image CAPTCHA execution program.

Next, the procedure whereby the authentication server 12 generates the first image 32 and the second image 33 in the process of S3 is described below while referencing the flowchart of FIG. 7.

The authentication server 12 decides the secret image 31 to be embedded (S31). The vertical and horizontal size of the secret image 31 selected herein must be smaller than the vertical and horizontal sizes of both the first image 32 and the second image 33. Many types of secret images 31 of the same vertical and horizontal size may be preserved in the hard disk drive 23 of the authentication server 12, and many types of secret images 31 of different vertical and horizontal sizes may be preserved. The secret image 31 may be selected randomly from among those that satisfy the condition. In the present embodiment, the vertical and horizontal size of the second image 33 is set to be smaller than the vertical and horizontal size of the first image 32, as shown in the second data table 42 of FIG. 2(B).

The authentication server 12 then generates a first noise image (an example of the second original image of the present invention, not shown) of the same vertical and horizontal size as the vertical and horizontal size of the decided first image 32 (S32). The first noise image is an image in which the brightness values of the pixels are random values. For example, when an 8 bit grayscale image is generated as the noise image, the authentication server 12 generates a random number from 0 to 255 for each pixel and uses these random numbers as the brightness values of the pixels.

Next, the authentication server 12 decides an area in the first noise image where the secret image 31 will be embedded (referred to below as the secret image embedded area) (S33). The secret image embedded area is an area of the same vertical and horizontal size as the vertical and horizontal size of the secret image 31. If the secret image embedded area is in a position that falls within the first noise image, the secret image embedded area may be set to a random position in the first noise image.

The position of the secret image embedded area may be decided based on the degree of change. The degree of change, which is a value decided for each pixel, indicates the magnitude of change in brightness value with the surrounding pixels. With x denoting the horizontal coordinate of the pixel, y denoting the vertical coordinate, and B(x, y) denoting the brightness value of the pixel at the coordinates (x, y), the degree of change dB(x, y) of the pixel is defined by the following formula.

$$dB(x, y) = |B(x+1, y) - B(x, y)| + |B(x+1, y+1) - B(x, y)| + |B(x, y+1) - B(x, y)| + |B(x-1, y+1) - B(x, y)| + |B(x-1, y) - B(x, y)| + |B(x-1, y-1) - B(x, y)| + |B(x, y-1) - B(x, y)| + |B(x+1, y-1) - B(x, y)|$$

In other words, the degree of change dB(x, y) is the sum of all the absolute values of the differences between the brightness value of the pixel and the brightness values of the surrounding eight pixels. The authentication server 12 may calculate the degrees of change of the pixels in the first noise image and set the secret image embedded area in a position where many pixels having high degrees of change are gathered. The purpose of this is to ensure that the secret image 31 cannot be recognized when the first image 32 is viewed.

The authentication server 12 then cuts out a larger area containing the secret image embedded area from the first noise image, and creates a new image (referred to as the second noise image below) (S34). In this cutting out action, the brightness value of the target range is duplicated and no change is made to the brightness value of the first noise image. The vertical and horizontal size of the area cut out as the second noise image is the decided vertical and horizontal size of the second image 33. The authentication server 12 stores the position of the area cut out as the second noise image in the main memory 22 as the correct answer position ($dx_T$, $dy_T$). For example, the correct answer position ($dx_T$, $dy_T$) is the displacement of the coordinates of the top left end pixel of the cut out area relative to the coordinates of the top left end pixel of the first noise image. In other words, the correct answer position ($dx_T$, $dy_T$) indicates the position of the second noise image relative to the first noise image when the top left end pixel is used as a reference. The correct answer position may be expressed in any format as long as it preserves information of the relative positions of the two images.

The authentication server 12 then executes an embedding process on the first noise image (S35). The embedding process is a process of changing the set brightness value of the first noise image on the basis of the secret image 31. Because the vertical and horizontal size of the secret image embedded area is equivalent to the vertical and horizontal size of the secret image 31, the secret image 31 and the secret image embedded area of the first noise image correspond with each pixel. The brightness values of pixels of the secret image embedded area in the first noise image are increased or reduced as follows, based on the brightness values of corresponding pixels of the secret image 31.

For example, the amounts of increase or decrease of the brightness values of the first noise image (referred to as the amounts of change below) may be ½ the value of the differences between the brightness values of the first noise image and the brightness values of the secret image 31. Another alternative is for values decided beforehand to be used for the amounts of change. For example, when the secret image 31 is a character string such as the one in FIG. 3(A), two different amounts of change may be used for pixels corresponding to lines constituting the text and pixels not of lines constituting the text.

The authentication server 12 then executes an inversion process on the first noise image (S36). The inversion process is a process of inverting the brightness values of the pixels. In an 8 bit grayscale image, denoting the brightness value before inversion as B, the brightness value B' after inversion is B'=255−L.

The authentication server 12 then executes a semitransparency process on the second noise image (S37). The semitransparency process is a process of increasing the transparency of the image. The degree of transparency in the semitransparency process is preferably approximately 50%, but it is not necessary. For example, the degree of transparency may be approximately 40% to 60%, and there could even be cases where it may be 20% to 80%. The semitransparency process is not described in detail because it is a conventionally known technique.

Having gone through the processes above, the first noise image is used as the first image 32 and the second noise image is used as the second image 33. In the present embodiment, an example is presented in which the embedding process and the inversion process are performed on the first noise image and the semitransparency process is performed on the second noise image, but these three processes may be performed on either image. For example, all of the processes may be performed on the first noise image or the second noise image. Alternatively, the embedding process alone may be performed on the first noise image, and the inversion process and semitransparency process may be performed on the second noise image. In other words, the embedding process, the inversion process, and the semitransparency process are each preferably performed on either one of these images.

[Operational Effects of Embodiment]

In the present embodiment, the optimal CAPTCHA for the user terminal 13 can be provided because different CAPTCHAs are executed according to the type of web browser running in the user terminal 13. Particularly in a mobile terminal 13M, a CAPTCHA based on the first image 32 and the second image 33 is executed. In this case, the operator of the mobile terminal 13M need only move the image by a drag operation on the touch panel 29. Even in a mobile terminal 13M having no keyboard 26, a CAPTCHA can be easily completed, particularly because text input is not required.

Because the generation of problem data and correct answer data and the determination of whether or not the authentication has succeeded are executed by the authentication server 12, the load of the transaction executed by the web server 11 can be reduced. The procedure needed for the web server 11 is only to install the first authentication program, and the manager of the web server 11 does not need to be aware of the details of the authentication action. In other words, the load on the manager of the web server 11 is reduced. Authentication requests sent to a plurality of web servers 11 are executed in a single authentication server 12, and the costs and security risks associated with authentication can thereby be consolidated into a single authentication server 12.

A CAPTCHA provided by the image CAPTCHA execution program is difficult to correct for the program running in the user terminal 13. This is described below. Pattern recognition is commonly used in order for the program to recognize an image. For pattern recognition to be executed, the class of the object being recognized must be defined beforehand in multidimensional characteristic space. However, in the present embodiment, the secret image 31 is hidden in the user terminal 13. Therefore, the program running in the user terminal 13 is unable to use pattern recognition to recognize the secret image 31. Even if the secret image 31 has been made clear, pattern recognition must be executed on every image restored in all relative positions of the first image 32 and the second image in order for the program running in the user terminal 13 to specify the correct answer position. In this case, there will be an incredibly large number of calculation steps, and it will be difficult to specify the correct answer position. If there is an operator of the user terminal 13, the operator can, while moving the second image 33 relative to the first image 32, immediately recognize that a meaningful image has been restored by confirming the display on the display device 27 or the touch panel display 29.

Because the determination of whether or not the authentication has succeeded is made based on a threshold, even if the answer position sent from the user terminal differs somewhat from the actual correct answer position, the authentication server 12 can determine that authentication has succeeded when the displacement between the answer position and the correct answer position is small.

The following are descriptions of modifications of the embodiment presented above.

[Modification 1]

In the embodiment presented above, the first image 32 and the second image 33 were generated in the process of S3, but the first image 32, the second image 33, and their corresponding correct answer positions may be stored beforehand. In other words, sets of first images 32 and second images 33 of different vertical and horizontal sizes may be stored on the hard disk drive 23 of the authentication server 12 together with the correct answer data indicating the correct answer positions. In the process of S3, a set of an appropriate first image 32 and second image 3 (*2) may be selected according to the decided vertical and horizontal size.

Other than the first image 32 and the second image 33, an additional image may be used which the operator of the user terminal 13 can move on the screen of the display device 27 or the touch panel display 29. These images should be of natural objects or man-made objects, and the operator of the user terminal 13 should be able to understand the arrangements due to common knowledge, custom, or other knowledge held by most people. An example is shown below.

For example, a first image 61, a second image 62, a third image 63, and a fourth image 64 such as those shown in FIGS. 8(A) to (D) may be used. These images are stored in the hard disk drive 23 of the authentication server 12. The first image 61 is an image of a person, the second image 62 is an image of glasses, the third image 63 is an image of a straw hat, and the fourth image 64 is an image of a bug-catching net. The correct answer positions of these four images are relative positions such as are shown in FIG. 8(F). Arranging the four images in these relative positions causes the person to be shown as wearing the glasses and straw hat and holding the bug-catching net. The operator of the user terminal 13 uses the mouse 25, for example, to operate a mouse cursor 65 on the screen of the display device 27 as shown in FIG. 8(E), and the operator moves the four images relative to each other in the directions of the arrows and puts the images in the relative positions in FIG. 8(F). The same operation is also performed by dragging the images on the touch panel display 29. With the movement ending operation, the transmitting of the answer position via the web server 11 to the authentication server 12 and the comparing of the answer position with the correct answer position to determine whether or not the authentication of has succeeded are the same as in the embodiment presented above.

The first image 61, the second image 62, the third image 63, and the fourth image 64 combined are an example of the image set of the present invention.

In such modifications, the answer position and the correct answer position include information of the relative positions of the second image 62, the third image 63, and the fourth image 64 using the first image 61 as a reference, for example. Therefore, when a threshold is used in the determination of whether or not the authentication has succeeded, thresholds may be provided respectively to the three relative positions.

In the embodiment presented above, the total of the brightness values of the pixels is outputted as the brightness value of the section where the plurality of images overlap. In the example of FIG. 8(F), the glasses are displayed as being in front of the person in the area where the plurality of images overlap, and the straw hat is displayed as being in front of the person and the glasses. In other words, the brightness value of the second image 62 is outputted preferentially over the brightness value of the first image 61, and the brightness value of the third image 63 is outputted preferentially over the brightness value of the second image 62. What sort of display to use in the area where the plurality of images overlap may be decided with each image set, and this information may be stored in the hard disk drive 23 of the authentication server 12 together with the image sets.

Figure 9:
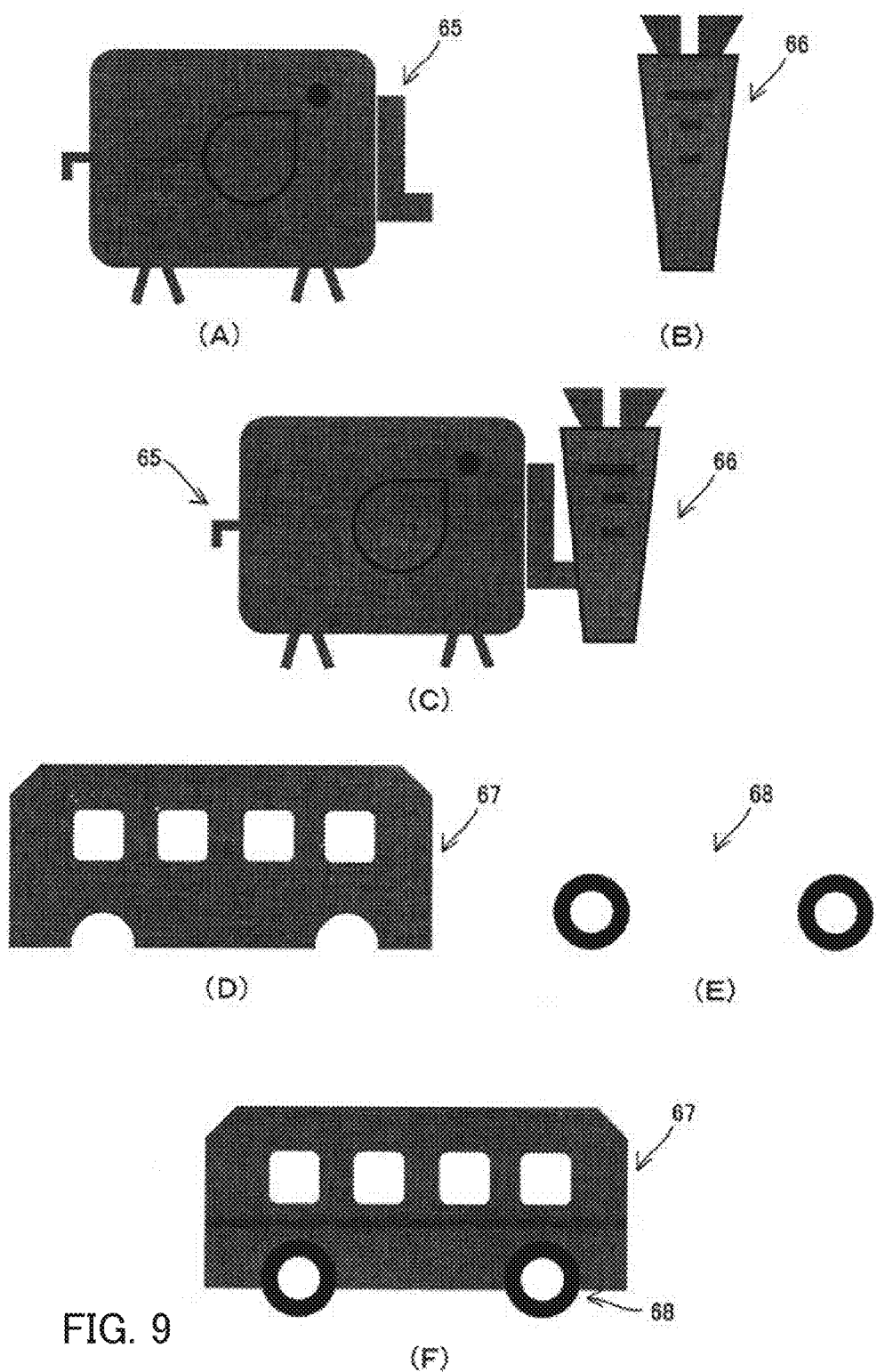
FIG. 9 is a drawing showing an example of a first image 65, a second image 66, a first image 67, and a second image 68 used in a modification of the present invention.

The plurality of images shown here are one example, and different images may be used. For example, the first image 65 may be an image of an elephant as shown in FIG. 9(A), and the second image 66 may be an image of a carrot as shown in FIG. 9(B). The correct answer position may be relative positions showing the elephant holding the carrot with its trunk as shown in FIG. 9(C).

The first image 67 may be an image of the body of a bus as shown in FIG. 9(D), and the second image 68 may be an image of tires as shown in FIG. 9(E). The correct answer position may be relative positions showing the tires as being attached to the body of the bus as shown in FIG. 9(F).

The first image 69 may also be an image of a torso of a humanoid robot as shown in FIG. 10(A), and the second image 70 may be an image of a head of a humanoid robot as shown in FIG. 10(B). The correct answer position may be relative positions showing the head as being attached to the torso of the robot as shown in FIG. 10(C).

The first image 71 and the second image 72, as shown in FIGS. 10(D) and (E), may be created from the original image 73 (an example of the first original image of the present invention) of FIG. 10(F). In the present modification, a photograph of a strawberry and the completed text string "Hungry? Strawberry" are used as the original image 73, but a different original image 73 may be used as long as a person can recognize the meaning. The first image 71 is an image in which part of the original image 73 has been cut out in the shape of a puzzle piece, and the second image 72 is an image of the cut out piece. The correct answer position is the relative positions of the first image 71 and the second image 72 when the puzzle piece is positioned in the cut out portion of the original image 73 and the original image 73 is restored.

The combined first image 65 and second image 66, the combined first image 67 and second image 68, the combined first image 69 and second image 70, and the combined first image 71 and second image 72 are each an example of an image set of the present invention.

[Modification 2]

In the embodiment presented above, the secret image 31 was stored beforehand in the hard disk drive 23 of the authentication server 12, but the secret image may be generated in the process of S3. For example, a secret image 31 showing any text string may be generated by randomly combining images of fonts stored in the hard disk drive 23 of the authentication server 12.

[Modification 3]

Minimum and maximum values may be stored as the vertical and horizontal sizes of the first image 32 and the second image 33 stored in the second data table 42. The authentication server 12 may generate a first image 32 and a second image 33 of which the vertical and horizontal sizes stay within the range from the minimum value to the maximum value. The second data table 42 may also store the vertical and horizontal sizes of secret images 31. The authentication server 12 may use a secret image of the vertical and horizontal size decided in the process of S2 to generate the first image 32 and the second image 33.

[Modification 4]

The first data table 41 may also store information indicating the type of OS (operating system) running in the user terminal 13. The web server 11 may determine the type of OS along with the type of web browser running in the user terminal 13, and may decide the CAPTCHA number. Similarly, the second data table 42 may store information indicating the type of OS.

[Modification 5]

In the generation of the first image 32 and the second image 33, on which between the first noise image and the second noise image to execute the embedding process, the inversion process, and the semitransparency process may be decided randomly using a random number or the like, for example.

[Modification 6]

In the embodiment presented above, the authentication server 12 conducts communication only with the web server 11 and does not directly communicate with the user terminal 13, but the authentication server may be configured so as to directly communicate with the user terminal 13. For example, the web server 11 may redirect access from the user terminal 13, and a TCP connection may be established between the user terminal 13 and the authentication server 12. At least part of the authentication action thereafter may be performed between the user terminal 13 and the authentication server 12.

[Modification 7]

The authentication server 12 and the web server 11 may be the same server device. In other words, all of the processes of S1 to S7, except for S5, may be executed by the same server device. Some of these processes may be executed by any other different server device.

REFERENCE NUMBERS

11 . . . Web server (server, first server device)
12 . . . Authentication server (server, second server device)
13 . . . User terminal
13P . . . Personal computer (user terminal)
13M . . . Mobile terminal (user terminal)
15 . . . Internet (computer network)
25 . . . Mouse (input means)
26 . . . Keyboard (input means)
27 . . . Display device (display screen)
29 . . . Touch panel display (input means, display screen)
31 . . . Secret image
32 . . . First image (image set, first image)
33 . . . Second image (image set, second image)
61 . . . First image (image set)
62 . . . Second image (image set)
63 . . . Third image (image set)
64 . . . Fourth image (image set)
65 . . . First image (image set)
66 . . . Second image (image set)
67 . . . First image (image set)
68 . . . Second image (image set)
69 . . . First image (image set)
70 . . . Second image (image set)
71 . . . First image (image set)
72 . . . Second image (image set)
73 . . . Original image (second original image)

The invention claimed is:

1. A method whereby a server provides an authentication CAPTCHA to a user terminal in a computer network, the user terminal having a display screen and input means, the CAPTCHA provision method comprising:

a web browser determination step in which the server determines the type of web browser run at the user terminal;

a CAPTCHA deciding step in which the server decides one of a plurality of CAPTCHA execution programs for executing mutually different CAPTCHAs in the web browser of the user terminal on the basis of the determined type of web browser, the CAPTCHA execution programs being stored in the server;

a CAPTCHA execution step in which the server executes the decided CAPTCHA execution program and causes the web browser of the user terminal to execute the CAPTCHA; and an authentication result determination step in which the server determines whether or not authentication has succeeded on the basis of answer data that the user terminal has generated according to the executed CAPTCHA, wherein the CAPTCHA execution step comprises:

an image deciding step in which the server decides one image set having a plurality of images;

an image display step in which the server causes the plurality of images included in the decided image set to be displayed in an image display from the display screen as defined by the web browser; and an image movement step in which the server puts image movement input and answer input from the input means into a state that the user terminal can receive, and causes at least one of the plurality of images to move relatively in the image display area on the basis of the received image movement input; and wherein the authentication result determination step is a step in which:

the server determines whether or not the answer data indicating the relative position of the plurality of images when the answer input is received satisfies a condition stored in the server, the server determining that authentication has succeeded when the condition is satisfied and that authentication has failed when the condition is not satisfied, wherein the authentication result determination step further comprises:

the server calculating a difference between the relative position of the plurality of images indicated by the answer data and the relative position indicated by correct answer data stored in the server, and the server determining whether or not the authentication has succeeded on the basis of whether or not an absolute value of the difference is less than a threshold stored in the server.

2. The CAPTCHA provision method according to claim 1, the image set and the correct answer data being generated by the server in the image deciding step; and the vertical and horizontal size of the plurality of images included in the image set being decided based on the type of web browser determined by the web browser determination step.

3. The CAPTCHA provision method according to claim 1, the image set including one image representing an animal/plant or a man-made object, and at least one image that either incorporates the animal/plant or man-made object, is attached to the animal/plant or man-made object, or represents something that is food for the animal/plant.

4. The CAPTCHA provision method according to claim 3, the animal/plant or man-made object being a human, a humanoid robot, a mammal other than a human, or a vehicle.

5. The CAPTCHA provision method according to claim 1, the image set including one image shown with part of a first original image missing, and at least one image that has a brightness value corresponding to the missing part and that restores the first original image by being placed in the missing part.

6. The CAPTCHA provision method according to claim 1, the image set including a first image and a second image, at least one of which has a secret image embedded in a visually indiscernible form;
   the secret image being included in at least part of an image obtained by totaling the brightness values of the corresponding pixels of the first image and the second image in an overlapping area where the first image and the second image overlap each other when the first image and the second image are in a relative position shown by the correct answer data; and
   the server outputting the total of the brightness values of the corresponding pixels of the first image and the second image in the overlapping area to the display screen as the brightness value of the overlapping area in the image display step.

7. The CAPTCHA provision method according to claim 6, the first image being an image generated from a second original image, and also being an image subjected to zero or more of the following three processes:
   an embedding process of embedding the secret image in the image by using a numerical value based on the brightness value of the secret image to convert the brightness value of the area where the secret image is embedded, compared to before the embedding of the secret image;
   an inversion process of inverting the brightness value of the image; and
   a semitransparency process of making the image semitransparent; and
   the second image being an image generated from the second original image, and also being an image subjected to any processes that of the three said processes were not performed on the first image.

8. The CAPTCHA provision method according to claim 1, the computer network being the internet; and
   the server having a first server device for telecommunicating with the user terminal, and a second server device for executing at least the authentication result determination step by telecommunicating with the first server device.

9. A method whereby a server provides an authentication CAPTCHA to a user terminal in a computer network, the user terminal comprising a display screen and input means, the CAPTCHA provision method comprising:
   an image deciding step in which the server decides one image set having a plurality of images;
   an image display step in which the server causes the plurality of images included in the decided image set to be displayed in an image display area defined in the display screen;
   an image movement step in which the server puts image movement input and answer input from the input means into a state that the user terminal can receive, and causes at least one of the plurality of images to move relatively in the image display area on the basis of the received image movement input; and
   an authentication result determination step in which the server determines whether or not the answer data indicating the relative positions of the images when the answer input was received satisfies a condition stored in the server, the server determining that authentication has succeeded when the condition is satisfied, and determining that authentication has failed when the condition is not satisfied,
   wherein the authentication result determination step further comprises:
   the server calculating a difference between the relative position of the plurality of images indicated by the answer data and the relative position indicated by correct answer data stored in the server, and the server determining whether or not the authentication has succeeded on the basis of whether or not an absolute value of the difference is less than a threshold stored in the server.

10. The method of claim 9, the image set and the correct answer data being generated by the server in the image deciding step; and
   the vertical and horizontal size of the plurality of images included in the image set being decided based on a type of web browser determined by a web browser determination step.

11. The method of claim 9, the image set including one image representing an animal/plant or a man-made object, and at least one image that either incorporates the animal/plant or man-made object, is attached to the animal/plant or man-made object, or represents something that is food for the animal/plant.

12. The method of claim 11, the animal/plant or man-made object being a human, a humanoid robot, a mammal other than a human, or a vehicle.

13. The method of claim 9, the image set including one image shown with part of a first original image missing, and at least one image that has a brightness value corresponding to the missing part and that restores the first original image by being placed in the missing part.

14. The method of claim 9, the image set including a first image and a second image, at least one of which has a secret image embedded in a visually indiscernible form;
   the secret image being included in at least part of an image obtained by totaling the brightness values of the corresponding pixels of the first image and the second image in an overlapping area where the first image and the second image overlap each other when the first image and the second image are in a relative position shown by the correct answer data; and
   the server outputting the total of the brightness values of the corresponding pixels of the first image and the second image in the overlapping area to the display screen as the brightness value of the overlapping area in the image display step.

15. The method of claim 14, the first image being an image generated from a second original image, and also being an image subjected to zero or more of the following three processes:
   an embedding process of embedding the secret image in the image by using a numerical value based on the brightness value of the secret image to convert the brightness value of the area where the secret image is embedded, compared to before the embedding of the secret image;

an inversion process of inverting the brightness value of the image; and a semitransparency process of making the image semitransparent; and the second image being an image generated from the second original image, and also being an image subjected to any processes that of the three said processes were not performed on the first image.

16. The method of claim 9, the computer network being the internet; and the server having a first server device for telecommunicating with the user terminal, and a second server device for executing at least the authentication result determination step by telecommunicating with the first server device.

17. A program stored in a non-transitory computer-readable storage medium and programmed to run in a server in order for the server to provide an authentication CAPTCHA to a user terminal in a computer network configured at least from the server and the user terminal, which is provided with a display screen and input means, the program comprising:

an image deciding function for causing the server to execute a process of deciding one image set having a plurality of images;

an image display function for causing the server to execute a process of displaying the plurality of images included in the decided image set in an image display area defined on the display screen;

an image movement function for causing the server to execute a process of putting image movement input and answer input from the input means into a state that can be received by the user terminal, and a process of moving at least one of the plurality of images relatively within the image display area on the basis of the received image movement input; and an authentication result determination function for causing the server to execute a process of determining whether or not the answer data indicating the relative positions of the images when the answer input was received satisfies a condition stored in the server, determining that authentication has succeeded when the condition is satisfied, and determining that authentication has failed when the condition is not satisfied, wherein the process performed by the authentication result determination function further comprises calculating a difference between the relative position of the plurality of images indicated by the answer data and the relative position indicated by correct answer data stored in the server, and determining whether or not the authentication has succeeded on the basis of whether or not an absolute value of the difference is less than a threshold stored in the server.

18. The program stored in the non-transitory computer-readable storage medium of claim 17, the image set and the correct answer data being generated by the image deciding function; and the vertical and horizontal size of the plurality of images included in the image set being decided based on a type of web browser determined by a web browser determination function.

19. The program stored in the non-transitory computer-readable storage medium of claim 17, the image set including one image representing an animal/plant or a man-made object, and at least one image that either incorporates the animal/plant or man-made object, is attached to the animal/plant or man-made object, or represents something that is food for the animal/plant.

* * * * *